INVENTOR
LOREN WASHBURN, DECEASED
BY CURTIS EDWARD WASHBURN, ADMINISTRATOR

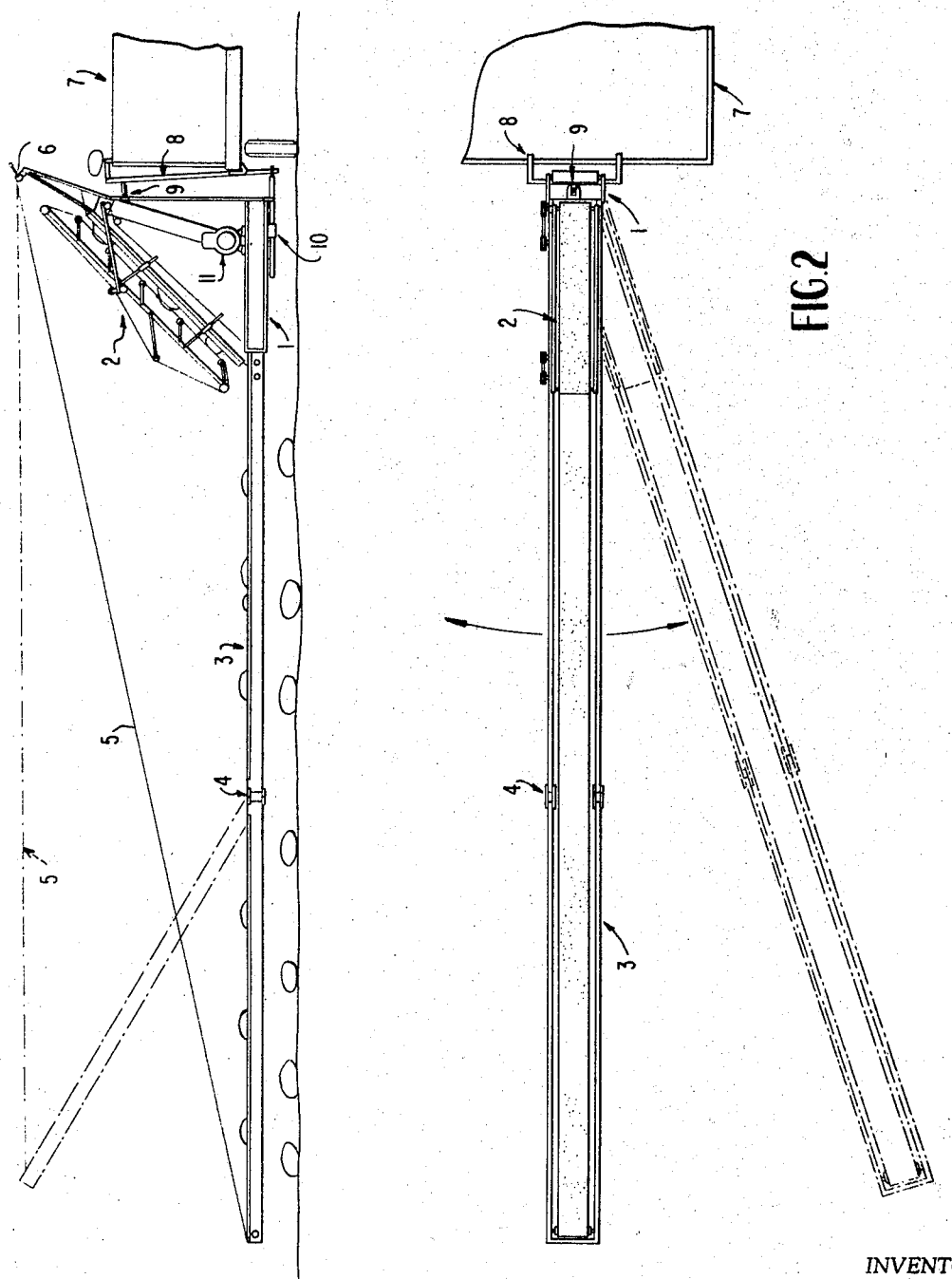

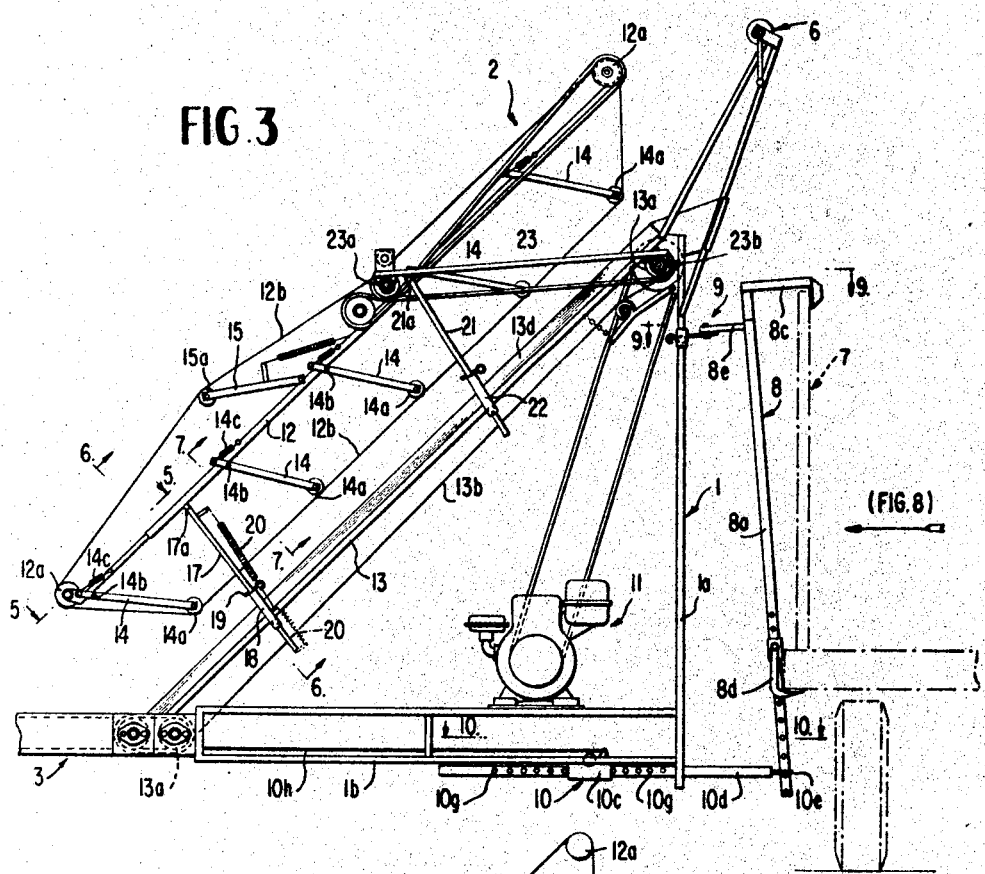

BY Rupert J. Brady
ATTORNEY

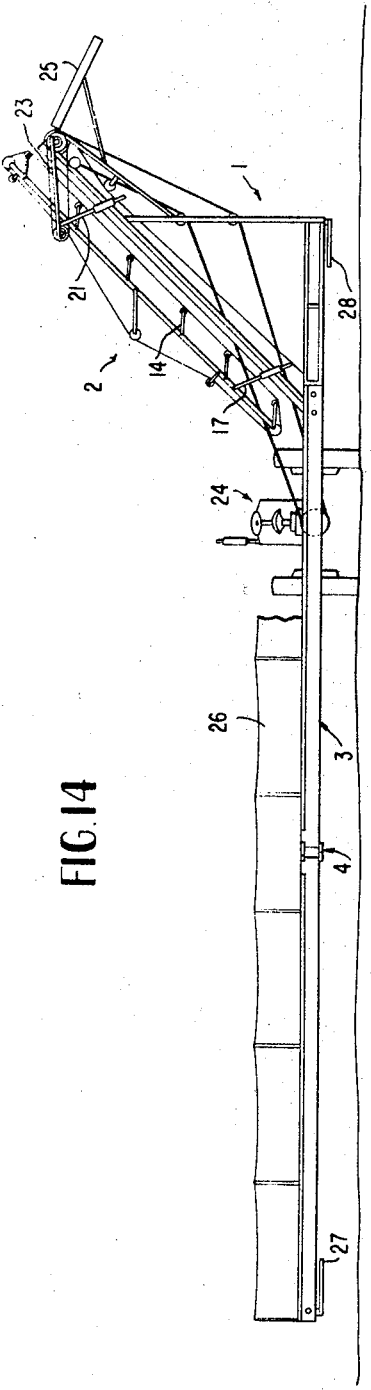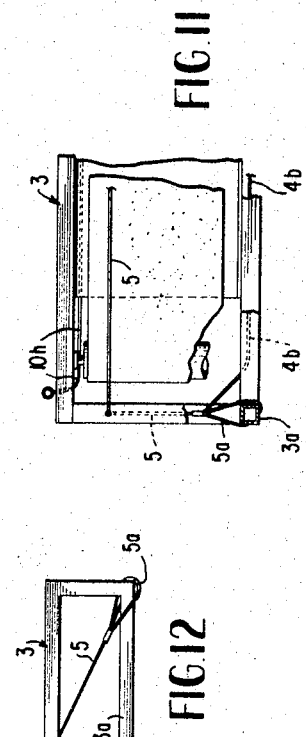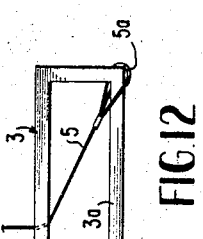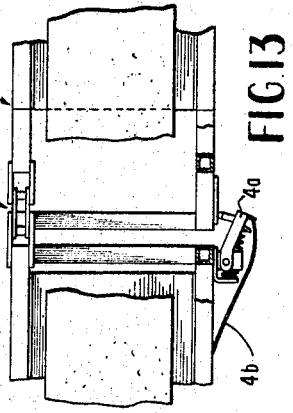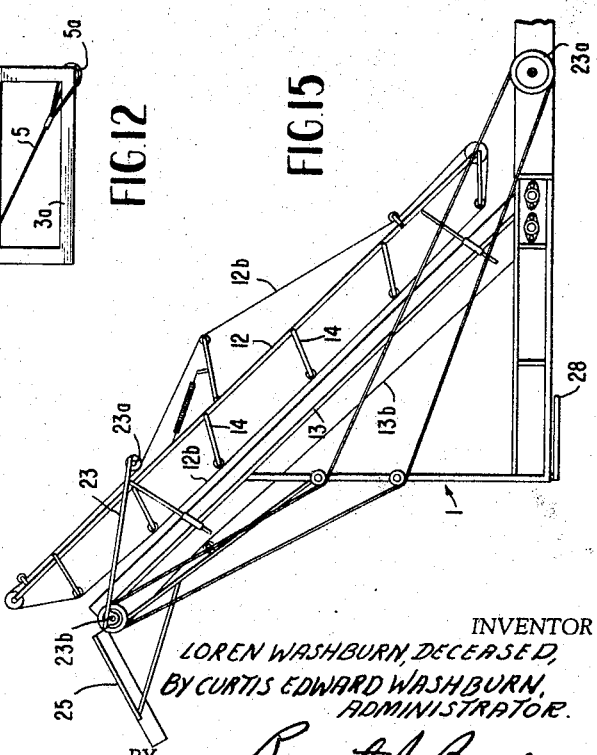

United States Patent Office 3,448,848
Patented June 10, 1969

3,448,848
FIELD CONVEYOR FOR GATHERING
HARVESTED FARM PRODUCE
Loren Washburn, deceased, late of St. Petersburg, Fla., by Curtis Edward Washburn, administrator, Riverview, Fla., assignor to Progressive Industries, Inc., Tampa, Fla., a corporation of Florida
Filed Apr. 4, 1967, Ser. No. 628,317
Int. Cl. B65g 37/00, 31/02, 41/00
U.S. Cl. 198—88            8 Claims

ABSTRACT OF THE DISCLOSURE

A horizontally disposed, relatively long conveyor for conveying harvested farm produce from the field to an inclined conveyor which delivers the produce to a storage receptacle.

Background of the invention

Heretofore, the customary method of gathering harvested farm produce such as melons and vegetables, etc., consisted of the farm workers gathering the produce into baskets or sacks and carrying the filled baskets to a truck where the produce was deposited. In some instances, the workers would employ pitchforks for pitching the produce directly into the truck as the truck moved slowly adjacent the field or between the rows of the produce being harvested.

In order to expedite this type of produce gathering, it has been proposed to provide conveyors whereby the workers in the field deposit the harvested produce on a horizontally disposed conveyor which carries the produce to an inclined conveyor for delivery into the truck. While these conveyors have been satisfactory for their intended purpose, they have been subject to certain objections, particularly with regard to the inability of the inclined elevator for selectively handling various types of produce. For example, a conveyor which was designed to handle pickles and cucumbers could not handle relatively large muskmelons and watermelons.

To overcome the disadvantages experienced in these hitherto employed conveyors, the conveyor of the present invention has been devised which can be quickly and easily adjusted to handle various types and sizes of farm produce such as finger-sized pickles, normal size cucumbers and relatively large muskmelons and watermelons. When using the conveyor of the present invention for gathering harvested melons, it has been found that four times as many melons were gathered than by the old method of manually gathering the melons into a basket and carrying the basket to a truck, and it has also been found that three men pitching cabbage onto the conveyor can load a truck in approximately half the time normally taken by six men using pitchforks to pitch the cabbage over the sides of the truck.

Summary

The conveyor of the present invention comprises, essentially, a frame having an inclined elevating conveyor secured thereto, and a relatively long horizontally disposed endless-belt type conveyor secured to the frame, one end of the horizontal conveyor being disposed adjacent the lower end of the elevating conveyor. The elevating conveyor comprises a pair of superimposed endless belts which are adapted to receive the harvested produce between the lower run of the upper belt and the upper run of the lower belt and to discharge the produce at the upper end thereof into a truck. The superimposed endless belts are constructed and arranged whereby the space between the lower run of the upper belt and the upper run of the lower belt can be selectively adjusted to accommodate the particular farm produce being harvested, and a plurality of spring biased rollers are provided for pressing the lower run of the upper belt against the produce being elevated whereby various sizes of the selected produce can be conveyed to the truck. The horizontal conveyor is adapted to extend approximately twenty feet into the harvesting area and is provided with a latched hinge at its medial portion whereby the outer end portion of the conveyor can be pivoted into a vertical plane when transporting the conveyor from one harvesting area to another, or to shorten the projecting length of the conveyor when making turns at the end of the field and an adjustable support is mounted on the frame for supporting the horizontal conveyor at a desired height above the ground.

The frame carrying the horizontal and elevating conveyors is adapted to be adjustably mounted on the side of the truck to be loaded and is adapted to freely pivot about an axis inclined to the vertical to thereby prevent damage to the conveyors and eliminate backlash due to the stopping and starting of the truck.

The conveyors are driven by suitable pulleys and belts, or sprockets and chains powered by a small internal combustion engine supported on the frame. In some instances, it is desirable to secure the frame and associated conveyors to a tractor wherein the conveyors are driven by the tractor power take-off. In this arrangement the conveyors are carried and powered by the tractor and the produce is delivered to a truck driven adjacent the tractor.

Stands are also provided at the free end of the horizontal conveyor and at the frame for supporting the conveyor assembly when not mounted on a truck or tractor.

Brief description of the drawings

FIGURE 1 is a side elevational view of the conveyor assembly of the present invention showing the conveyor assembly mounted on the side of a truck;

FIGURE 2 is a top plan view of the conveyor assembly illustrated in FIGURE 1;

FIGURE 3 is an enlarged side elevational view of the elevating portion of the conveyor illustrated in FIGURE 1;

FIGURE 4 is a schematic view of the elevating portion of the conveyor showing the relative positions of the various components of the conveyor when an article is being conveyed thereon;

FIGURE 11 is a fragmentary top plan view of the end of the horizontal portion of the conveyor;

FIGURE 12 is an end elevational view of the conveyor frame illustrated in FIGURE 11;

FIGURE 13 is a top plan view of the medial portion of the horizontal conveyor;

FIGURE 14 is a side elevational view of the conveyor assembly of the present invention mounted on a tractor; and FIGURE 15 is a fragmentary side elevational view of the elevating portion of the conveyor illustrated in FIGURE 14.

Description of the preferred embodiment

Figure 5:
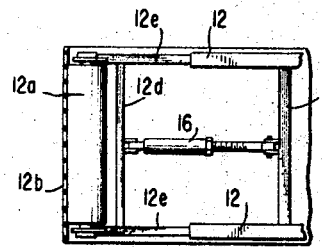
FIGURE 5 is a view taken along line 5—5 of FIGURE 3.

Referring to the drawings and more particularly to FIGURES 1 and 2 the conveyor of the present invention comprises essentially a frame 1 having an inclined conveyor 2 and a horizontal endless belt type conveyor 3 mounted thereon. The horizontal conveyor is provided with a hinge as at 4 to permit the outer end portion of the conveyor to be elevated in a vertical plane, as shown in dotted lines in FIGURE 1, the elevating of the end portion of the conveyor being accomplished by a cable 5 extending from the outer end of the conveyor to a winch 6 mounted on the upper end of frame 1. The frame and associated conveyors are adapted to be carried on the side of a truck 7 through a hook assembly 8, a pivotal connection 9 being provided between the frame 1 and the hook assembly allowing the frame to pivot freely about an axis inclined to the vertical, as indicated in dotted lines in FIGURE 2, to thereby prevent damage to the conveyors by eliminating backlash due to the stopping and starting of the truck. The height at which the free end of the horizontal conveyor is supported above the ground can be arcuately varied by an adjustable support 10 secured to the underside of the frame 1 and connected to the hook assembly 8. Power to prive the conveyors is obtained from an internal combustion engine 11 mounted on the frame and connected to the conveyors through suitable belts and pulleys.

As will be seen in FIGURES 3, 5, 6, and 7, the elevating conveyor 2 comprises a pair of spaced, parallel, superimposed, inclined frame members 12 and 13, each respective frame member having rollers 12a and 13a rotatably mounted on each end thereof for supporting endless belts 12b and 13b. A plurality of depending arms 14, having idler rollers 14a journaled on the lower ends thereof, is pivotally connected to the frame member 12 as at 14b, the idler rollers being biased against the lower run of the endless belt 12b by tension springs 14c connected between the upper end of the arms and the frame member. An upwardly extending spring biased arm 15 is also pivotally connected to the frame 12, the outer end of the arm carrying an idler roller 15a which engages the upper run of belt 12b to impart a suitable tension to the belt. Further adjustment of the tension on belt 12b can be accomplished by means of a screw assembly 16 (FIGURE 5) having one end connected to transverse frame member 12c and the opposite end connected to a transversely extending frame member 12d. The ends of transverse frame 12d are connected to a pair of arms 12e which carry roller 12a, the arms being telescopically received within the end of the longitudinally extending frame 12.

Figure 6:
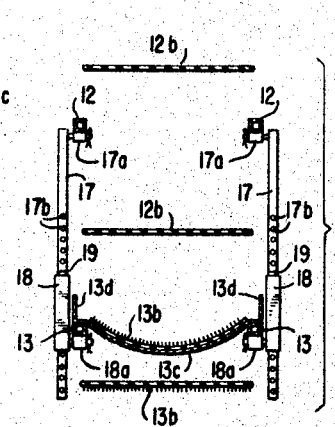
FIGURE 6 is a view taken along line 6—6 of FIGURE 3.

As will be seen in FIGURE 6, the upper run of the lower belt is adapted to be supported by a trough 13c secured to the longitudinally extending frames 13. Longitudinally extending side members 13d are also secured to the frames 13 to insure that the product being conveyed remains on the belt; the maintaining of the produce on the belt is further enhanced by providing the face of the belt with a frictional surface.

Figure 7:
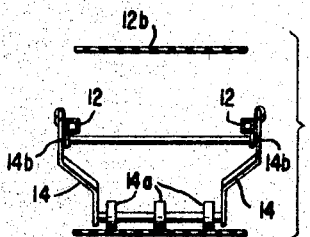
FIGURE 7 is a view taken along line 7—7 of FIGURE 3.
Figure 7A:
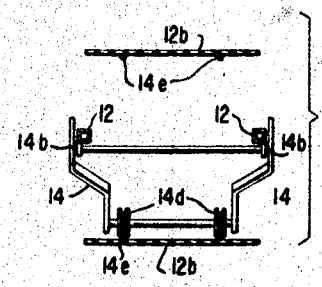
FIGURE 7a is a view similar to FIGURE 7 showing a modification of a belt and pulley assembly.

While the idler rollers 14a, as shown in FIGURE 7, are provided with smooth peripheral surfaces, in some instances, where the belt 12b is to be driven at a relatively high speed, it is desirable to provide idler rollers 14d (FIGURE 7a) with grooves in the peripheral surfaces thereof which are adapted to be engaged by V belts 14e bonded to the bottom face of the belt. By this construction and arrangement, the lower run of belt 12b is maintained aligned with the upper run of belt 13b.

One of the important features of the present invention is the ability of the elevating conveyor to accommodate produce of various sizes between the lower run of the upper belt 12b and the upper run of the lower belt 13b. To accomplish this, a pair of depending arms 17 (FIGURES 3 and 6) is pivotally connected to the lower end portions of frames 12 as at 17a, the lower end portions of the arms 17 being slidably received within a pair of sleeves 18 pivotally connected to frames 13 as at 18a. A plurality of apertures 17b are formed in the arms 17 for selectively receiving pins 19 which abut the top edge of the sleeves 18. A tension spring 20 is connected between the arm 17 and sleeve 18 for urging the frames towards each other. Another pair of depending arms 21, similar to arms 17, is provided at the upper end portion of the elevating conveyor, the lower end of each of the arms being slidably mounted within a sleeve 22 pivotally secured to frame 13, the upper end of each of the arms being pivotally connected as at 21a to an arm 23 which extends between the frames, the ends of the arms being pivotally connected to frames 12 and 13 at 23a and 23b, respectively.

By the construction and arrangement of the slidable arms 17, arm 23, and spring biased idler rollers 14a, the endless belts 12b and 13b are adopted to convey produce of various sizes as diagrammatically illustrated in FIGURE 4. In the operation of the elevator conveyor the space between the lower run of endless belt 12b and the upper run of belt 13b is adjusted by inserting the pins 19 in a selected aperature in the arms 17 and 21. The height of this space is determined by the type of produce to be gathered. For instance, when tomatoes are to be gathered, the arms would be adjusted to provide a minimum space between the opposed runs of the belts, and when gathering watermellons the arms would be adjusted to provide a maximum space between the belts. Assuming watermelons are to be gathered, the melons are placed on the horizontal conveyor 3 and are conveyed to the lower end of the elevating conveyor 2 where they enter the space between the lower run of belt 12b and the upper run of belt 13b whereby the melons are conveyed upwardly to the discharge end of the conveyor. Variations in size of the melons are accommodated by the arms 17 and 21 slidably mounted within sleeves 18 and 22 and the spring biased idler rollers 14a urging the lower run of belt 12b against the top surfaces of the melons. If a small watermelon is succeeded by a relatively large watermelon, as shown in dotted lines in FIGURE 4, the large melon, when it arrives at the entrance to the elevating conveyor, forces the lower end of frame 12 and associated conveyor belt 12b upwardly in a clockwise direction about pivot 23a causing arms 17 and associated pins 19 to slide upwardly relative to the sleeves 18 while expanding spring 20. The clockwise movement of frame 12 and conveyor 12b, while allowing the large melon to enter the lower end of the conveyor, forces the upper end of the belt, and associated spring-biased rollers, downwardly against the upper surfaces of the smaller melons positioned on the upper end of the conveyor, thereby causing the belt to assume an undulating configuration whereby the small melons are prevented from sliding downwardly on the conveyor. As the large melons travels beyond the arms 17, the spring 20 contracts causing the arms to slide inwardly within the sleeves 18, the downward movement of the arms being limited by the pins 19 abutting the upper end of the sleeves. The belt 12b will then be in position to receive the next succeeding melon.

When tomatoes or peppers are being conveyed, the increased biasing force of spring 20 urging the opposed runs of belts 12b and 13b together is not necessary; therefore, the biasing action of the spring can be reversed by connecting one end of the spring to the lower end of arm 17 and the opposite end to the sleeve 18, as shown in dotted lines in FIGURE 3.

Figure 8:
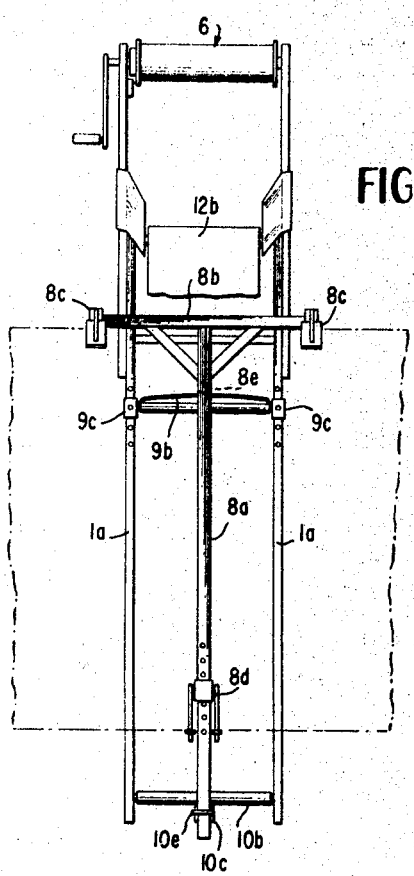
FIGURE 8 is an end elevational view of the elevating portion of the conveyor looking in a direction from the side of the truck as shown in FIGURE 3.
Figure 9:
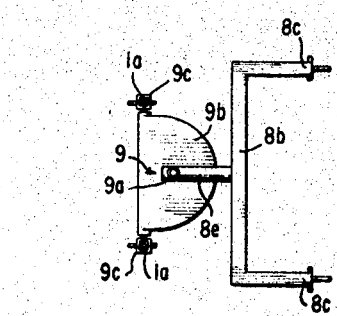
FIGURE 9 is a view taken along line 9—9 of FIGURE 3.

Referring to FIGURES 3, 8 and 9, the hook assembly 8 for mounting the conveyor on the side of the truck comprises a main arm 8a having a transverse arm 8b secured to the upper end thereof, the outer ends of the transverse arm having hooks 8c integrally secured thereto for engaging the upper edge of the truck side. The lower end of arm 8a is provided with a hook assembly 8d adapted to be adjustably mounted on the arm for engaging the frame of the truck. The medial portion of transverse arm is provided with an arm 8e which extends outwardly therefrom to form a part of the pivotal connection 9 between the frame 1 and the hook assembly 8. A pivot pin 9a (FIGURE 9) extends between the arm 8e and a plate member 9b pivotally connected at its opposite ends, about a horizontal axis, to a pair of sleeves 9c adjustably mounted on the vertical leg portion 1a of the frame.

Figure 10:
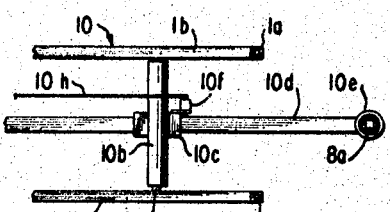
FIGURE 10 is a view taken along line 10—10 of FIGURE 3.

As will be seen in FIGURES 3, 10 and 11, the adjustable support 10 for varying the elevation of the free end of conveyor 3 above the ground comprises a shaft 10a secured at its opposite ends to the horizontally disposed frame portion 1b of the frame 1. A sleeve 10b, journaled on the shaft, is secured at its medial portion to a sleeve 10c slidably mounted on an arm 10d positioned beneath the frame portion 1b and having a ring 10e on one end thereof encircling the lower end portion of the hook assembly arm 8a. A detent assembly 10f, mounted on the sleeve, is adapted to selectively engage a plurality of apertures 10g formed in the arm 10d, the actuation of the detent assembly being accomplished by means of a cable 10h extending from the detent to the outer end of the horizontal conveyor (FIGURE 11). When it is desired to change the height at which the free end of conveyor 3 is positioned above the ground, the cable 10h is tensioned to release the detent 10f. The free end of the horizontal conveyor is then lifted or lowered, as the case may be, thereby causing the horizontal portion 1b of the frame and its associated sleeve 10c to move relative to the arm 10d. When the desired height is obtained the cable is released allowing the detent to engage a selected aperture in the arm.

Referring to FIGURE 3, it will be noted that pivoted connection 9 and end 10e of arm 10d form an axis inclined to the vertical, whereby the frame 1 and associated horizontal conveyor 3 are freely pivoted to the hook assembly 8, whereby the force of gravity urges the frame and associated conveyor to a position normal to the hook assembly. Thus, when the horizontal conveyor is pivoted about the inclined vertical axis, the free end of the conveyor swings through an arc causing the end of the conveyor to rise relative to the ground; however, the force of gravity urges the conveyor to return to its normal position. By this construction and arrangement, the conveyor 3 seeks its normal position relative to the hook assembly without requiring the use of guy wires or other cables.

Referring to FIGURES 1, 11, 12 and 13 the cable 5 employed for pivoting the outer end portion of the horizontal conveyor in a vertical plane about hinge 4, is provided with a loop 5a for securing the cable to the frame 3a of the conveyor. The hinge 4 is provided with a spring-biased latch 4a which is adapted to be actuated by a cable 4b having one end connected to the latch and the opposite end connected to the cable 5 at the free end of the horizontal conveyor. By this construction and arrangement, the tension applied to cable 5 to lift the outer end portion of the conveyor is transmitted to cable 4b which in turn releases the latch 4a at the hinge 4 whereby the outer end portion of the conveyor may be pivoted upwardly. After the outer end portion of the conveyor has been lowered the release of tension on cables 5 and 4b allows the latch 4a to be biased into locking position.

While the conveyor assembly thus far described is adapted to be mounted on the side of a truck 7 and powered by an internal combustion engine 11, the frame 1 and associated conveyors 2 and 3 are equally adaptable to be mounted upon and powered by a tractor 24 as will be seen in FIGURES 14 and 15. In this arrangement, the conveyors are driven by suitable belts and pulleys connected to the tractor power take-off 24a. The upper or discharge end of the elevating conveyor is provided with a chute 25 for directing the harvested produce into a truck (not shown) which would be driven parallel to the tractor. The horizontal conveyor 3 is also provided with a backstop 26 which deflects the harvested produce onto the conveyor as it is tossed thereon by the farm workers. In the event that the conveyor assembly is to be employed in a stationary position legs 27 and 28 are hingedly connected to the free end of the conveyor 3 and the frame 1, respectively, for supporting the assembly on the ground.

In the operation of the conveyor assembly of the present invention, whether it be mounted on the side of the truck or on the tractor, the elevating conveyor is first adjusted, as described hereinabove, for accommodating the particular produce to be harvested. The frame 1 and associated conveyors 2 and 3 are moved slowly either at the edge of the field or between the rows of the crops to be harvested and the farm workers harvesting the crops walk behind the trailing edge of the horizontal conveyor and toss the harvested produce onto the horizontal conveyor, whereby the produce is conveyed to the elevating conveyor wherein the produce is grasped between the lower run of the upper belt and the upper run of the lower belt and conveyed to the discharge end of the conveyor and deposited into the truck. When the conveyor assembly reaches the end of the field being harvested the projecting end of horizontal conveyor is pivoted upwardly to clear any obstructions while turning the conveyor assembly to return in the opposite direction.

What is claimed is:

1. An inclined conveyor comprising, a pair of spaced, parallel, superimposed, inclined frame members; an endless belt carried by each of said inclined frame members; a concave body portion connected to the lower inclined frame member of said pair of frame members substantially throughout the length thereof; the upper endless belt having a lower run spaced above the upper run of the lower endless belt for accommodating articles to be conveyed therebetween; the upper run of the lower endless belt slidably supported by said concave body portion; a plurality of depending arms pivotally connected to the upper inclined frame member; idler roller means mounted on the lower end of each of said depending arms; spring means connected between each of said depending arms and said upper inclined frame member urging said idler roller means into engagement with the lower run of the upper endless belt and urging said lower run against the upper surface of the articles being conveyed; linkage arms on opposite sides of said frame members pivotally connected between the upper end of the lower inclined frame member and the medial portion of the upper inclined frame member; a first pair of arm members pivotally connected at the upper ends respectively to said linkage arms in proximity to the pivot connection of said linkage arms to said upper frame member; a second pair of arm members pivotally connected at the upper ends to said upper frame member near the lower end thereof; sleeve members pivotally connected to the lower frame member; the lower end portions of said first and second pairs of arm members being adjustably slidably mounted within said sleeve members and extending therethrough for varying the space between the lower run of the upper belt and the upper run of the lower belt; detent means selectively connected between the first and second pairs of arm members and the respective sleeve members to floatably support the upper frame member a selected distance above the lower frame member; pulley means connected on opposite ends of at least one of said linkage arms; a source of power; and means connected to said source of power and operatively connected to said pulley means and to the endless belts for driving the lower run of the upper belt and the upper run of the lower belt at the same speed and in the same direction, whereby articles of various sizes to be conveyed can be accommodated.

2. A conveyor according to claim 1 wherein the detent means comprises, a plurality of longitudinally spaced apertures formed in the arm members and a pin adapted to be inserted in a selected aperture and abutting the upper edge of the sleeve member whereby the upper frame member and associated arm member may move freely upwardly away from the lower frame member but the downward movement of the upper frame member being limited by the pin engaging the edge of the sleeve member.

3. A conveyor of the character described comprising, a pair of spaced, parallel, superimposed frame members; an endless belt carried by each of said frame members; the lower run of the upper belt being spaced above the upper run of the lower belt for accommodating articles to be conveyed therebetween; means operatively connected to the belts for driving the lower run of the upper belt and the upper run of the lower belt at the same speed and in the same direction; arm means connected between the frame members for supporting the upper belt a predetermined distance above the lower belt; said arm means being adjustable for varying the space between the lower run of the upper belt and the upper run of the lower belt to accommodate various sizes of articles to be conveyed; said superimposed frame members carrying said endless belts being inclined and secured to a support frame to form an elevating conveyor; a relatively long horizontally disposed endless belt conveyor carried by said support frame; the discharge end of said horizontal conveyor being positioned adjacent the lower end of said elevating conveyor; a hook assembly; said support frame freely pivoted to said hook assembly about an axis inclined to the vertical; and said hook assembly adapted for connection to the side of a truck, whereby damage due to backlash caused by the starting and stopping of the truck is eliminated.

4. A conveyor according to claim 3 including a hinge connected to the medial portion of the horizontal conveyor whereby the free end portion of the horizontal conveyor can be pivoted upwardly in a direction toward said support frame, and latch means connected to said hinge for locking the hinge when the free end portion of the horizontal conveyor is folded downwardly into a horizontal plane.

5. A conveyor according to claim 3 wherein the support frame is hingedly connected to the hook assembly for pivotal movement about a horizontal axis, and adjustable support means operatively connected between the support frame and the hook assembly whereby the height of the support frame above the ground can be varied.

6. A conveyor as set forth in claim 5 in which said adjustable support means includes a substantially horizontally disposed arm pivotally connected at one end to said hook assembly, and detent means pivotally connected to said support frame and connectable at selected distances along said horizontal arm to selectively vary the height of the free end portion of the horizontal conveyor above the ground.

7. A conveyor as set forth in claim 6 including detent operating means connected to operate said detent means and terminating at the free end portion of said horizontal conveyor, whereby the detent means can be operated and the height of the horizontal conveyor can be adjusted from the free end portion of the horizontal conveyor.

8. A conveyor as set forth in claim 7 in which said detent operating means comprises a flexible member extending longitudinally of said support frame and said horizontal conveyor.

References Cited

UNITED STATES PATENTS

| | | | |
|---|---|---|---|
| 1,887,699 | 11/1932 | Reid. | |
| 2,071,743 | 2/1937 | Hartburg | 198—165 |
| 2,410,996 | 11/1946 | Patterson | 214—521 |
| 2,576,992 | 12/1951 | Bainbridge et al. | 198—88 X |
| 2,782,943 | 2/1957 | Jones et al. | 214—83.1 |
| 2,916,138 | 12/1959 | Hume | 198—165 |
| 2,987,166 | 6/1961 | Gray | 198—165 |

RICHARD E. AEGERTER, *Primary Examiner.*

U.S. Cl. X.R.

198—124, 165; 214—83.26, 522